July 2, 1929.  H. N. WAYNE  1,719,738
CORD FABRIC WINDING MACHINE
Filed April 8, 1925  5 Sheets-Sheet 1
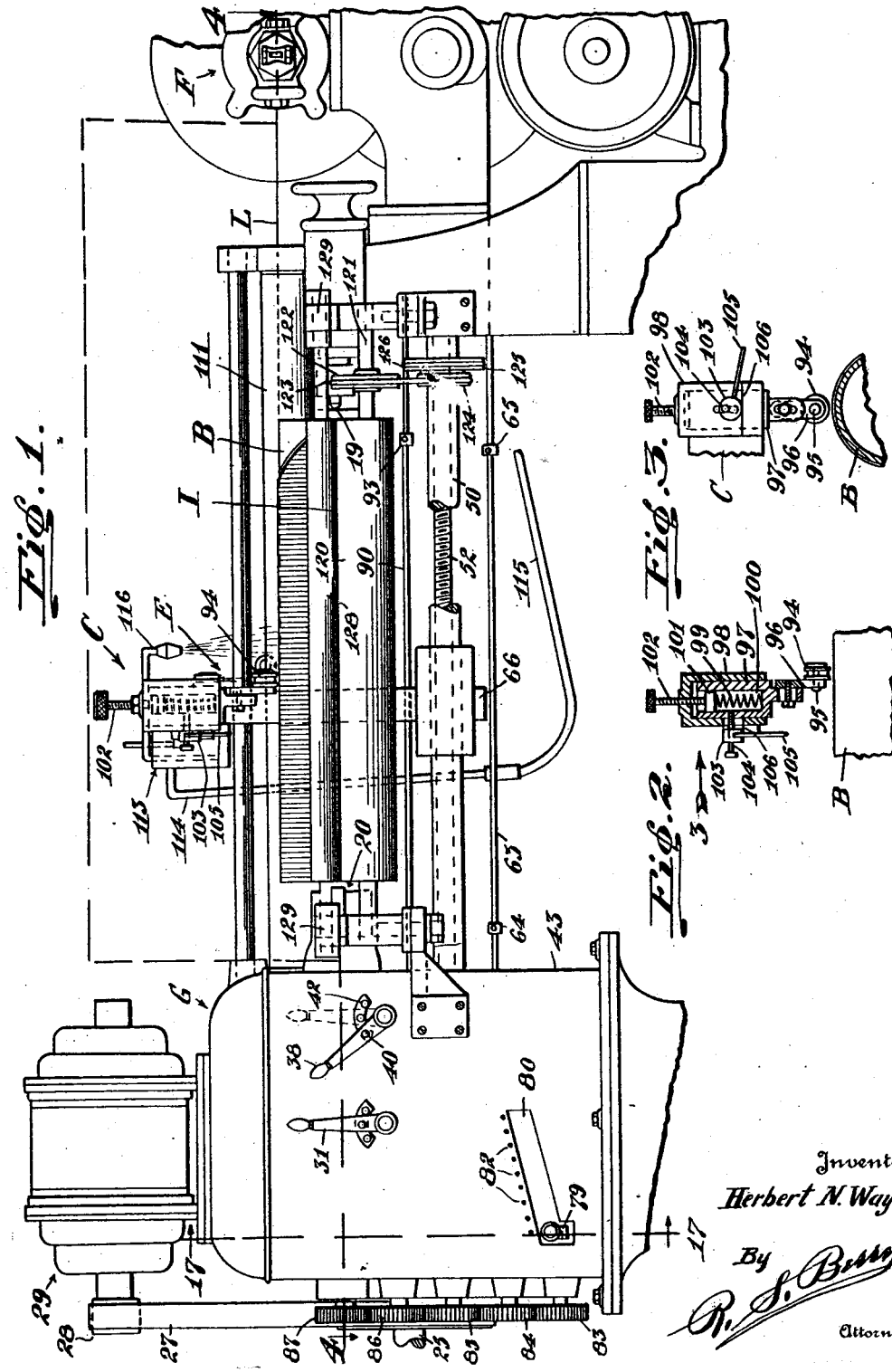
Inventor
Herbert N. Wayne
By
Attorney July 2, 1929.  H. N. WAYNE  1,719,738
CORD FABRIC WINDING MACHINE
Filed April 8, 1925   5 Sheets-Sheet 2
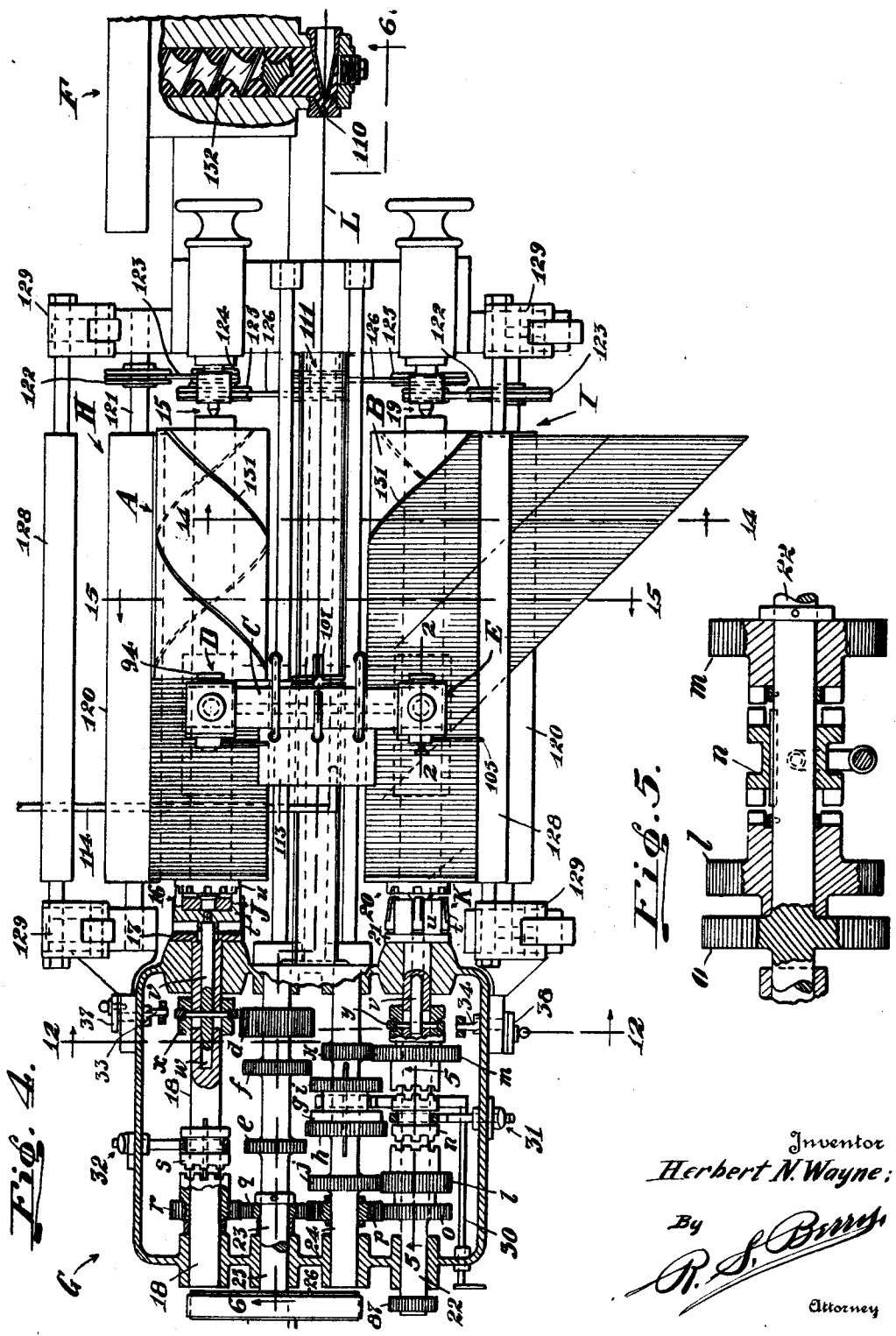
Inventor
Herbert N. Wayne;
By
Attorney

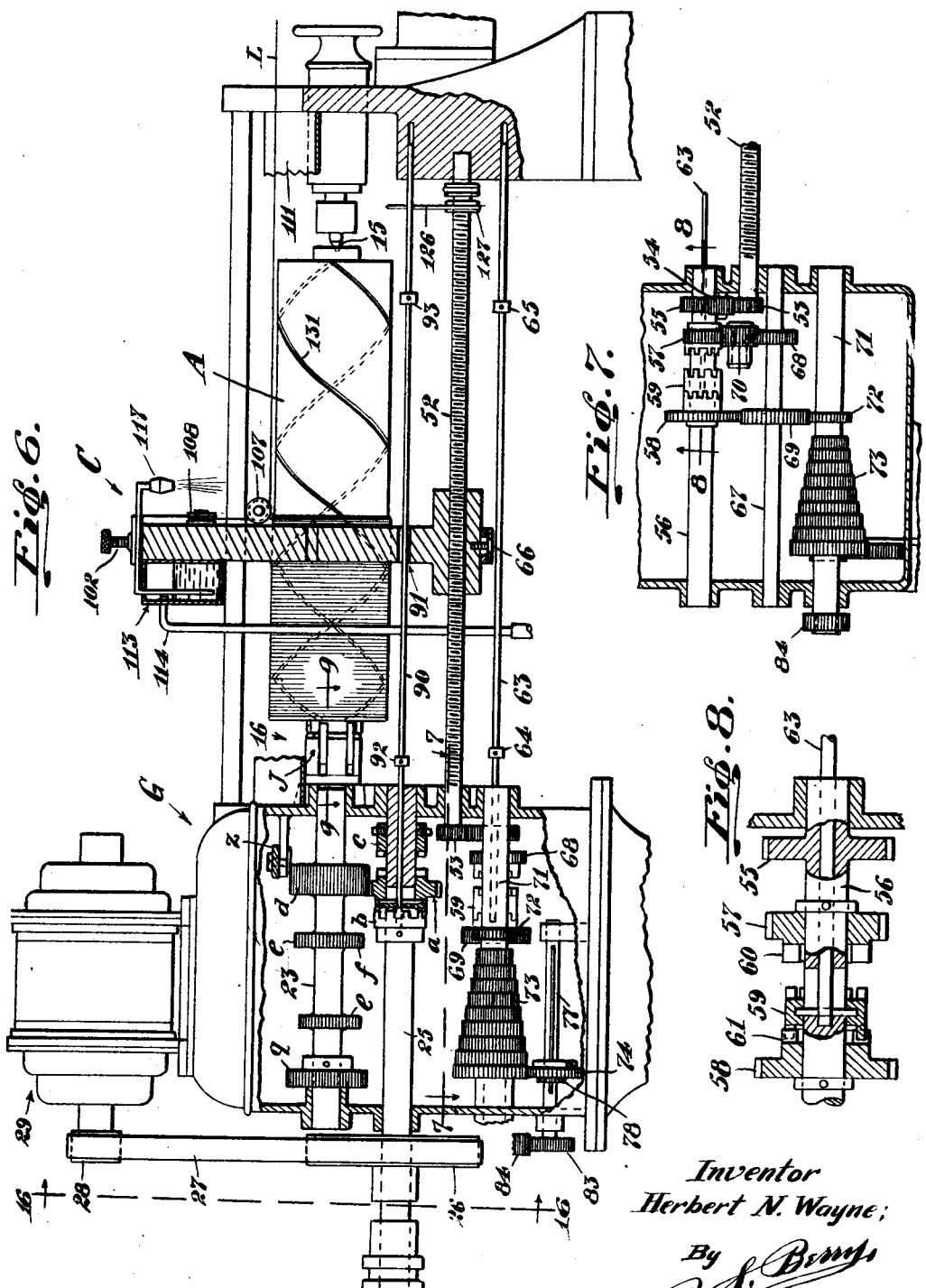

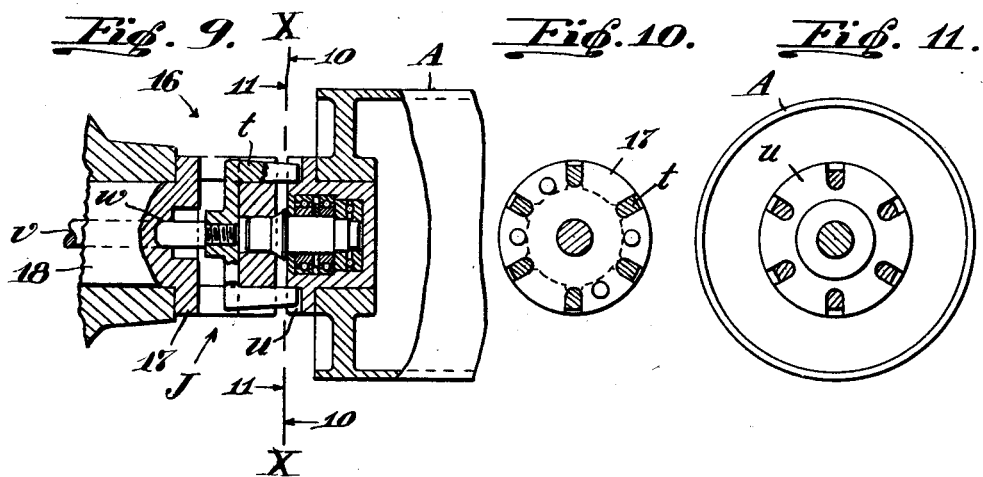
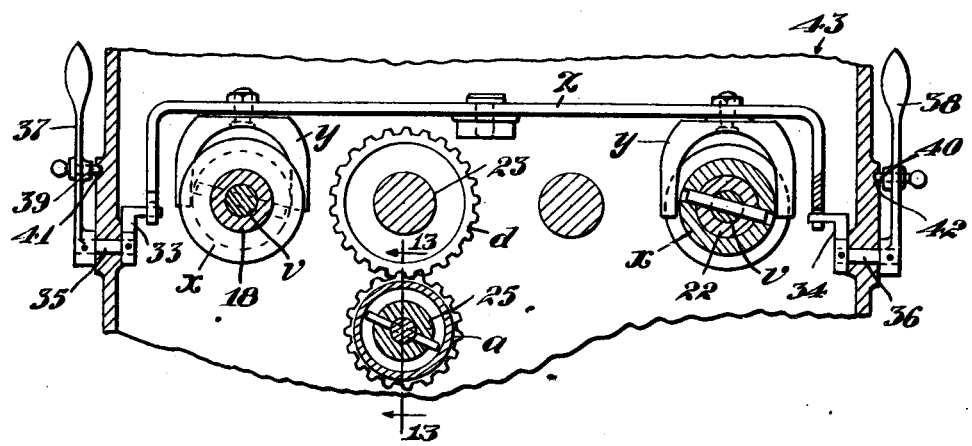
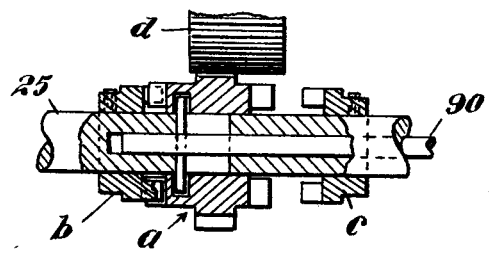

July 2, 1929. H. N. WAYNE 1,719,738
CORD FABRIC WINDING MACHINE
Filed April 8, 1925 5 Sheets-Sheet 5

Inventor
Herbert N. Wayne
By R. S. Berry
Attor.

Patented July 2, 1929.

1,719,738

UNITED STATES PATENT OFFICE.

HERBERT N. WAYNE, OF SANTA MONICA, CALIFORNIA.

CORD-FABRIC-WINDING MACHINE.

Application filed April 8, 1925. Serial No. 21,515.

This invention particularly pertains to a machine for winding rubberized cord in the manufacture of a rubberized fabric for use in the construction of pneumatic tire casings or carcasses.

An object of the invention is to provide a machine embodying a revolving winding mandrel or drum on which rubberized cord is spirally wound with adjacent windings laid in close contact to form one complete ply of cord fabric, and which machine embodies means whereby the pitch or spacing of the cord windings may be quickly varied to compensate for and to accommodate different thicknesses of rubber coated cord, and whereby the machine is adapted to be operated with winding mandrels of various diameters.

Another object is to provide a machine of the above character embodying a plurality of winding mandrels and in which the rubberized cord may be wound alternately on different mandrels whereby as the cord is being wound on one mandrel the previously formed fabric on the other mandrel may be stripped therefrom thus affording a practically continuous production and enabling rapidity of output.

Another object is to provide an arrangement whereby transfer of the rubberized cord from one winding mandrel to another may be readily effected.

Another object is to provide an effective means for stripping the completed cord fabric from the winding mandrels.

Another object is to provide an effective means for actuating and controlling the winding mandrels, the feed of rubberized cord thereto, and the stripping of the completed fabric from the mandrels, including manually operated controls operable from either of opposite sides of the machine to throw mandrels in and out of operation.

The mode of carrying out the foregoing objects, as well as such objects, features and advantages of the invention as may subsequently appear, is hereinafter described, and is illustrated by way of example in the accompanying drawings in which the several views depict constructions and arrangements of elements and parts whereby the invention may be carried into effect.

Referring to the drawings the several views are as follows:

Figure 1 is a view of the machine as seen in side elevation with parts broken away;

Figure 2 is a detail in vertical section of the cord feeding and tension device as seen on the line 2—2 of Figure 4;

Figure 3 is a detail in elevation of the cord feeding device as seen in the direction indicated by the arrow in Figure 2;

Figure 4 is a plan view of the machine, partly in horizontal section, as seen on the line 4—4 of Figure 1;

Figure 5 is a detail in vertical section with parts in elevation as seen on the line 5—5 of Figure 4;

Figure 6 is a view in longitudinal vertical section and elevation as seen on the line 6—6 of Figure 4;

Figure 7 is a view in horizontal section as seen on the line 7—7 of Figure 6;

Figure 8 is an enlarged detail in vertical section as seen on the line 8—8 of Figure 7;

Figure 9 is a detail in section as seen on the line 9—9 of Figure 6;

Figure 10 is a view in section and elevation as seen on the line X—X of Figure 9 in the direction indicated by the arrows 10;

Figure 11 is a view in section and elevation as seen on the line X—X of Figure 9 in the direction indicated by the arrows 11—11;

Figure 12 is a view in section and elevation as seen on the line 12—12 of Figure 4;

Figure 13 is a detail in vertical section as seen on the line 13—13 of Figure 12;

Figure 14:
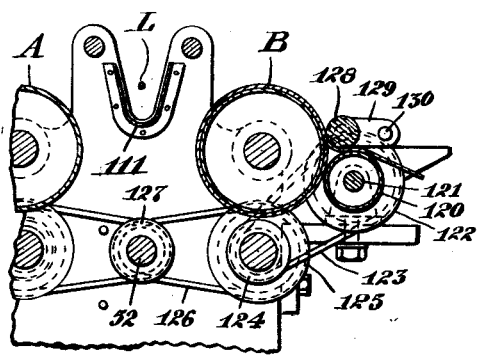
Figure 14 is a detail in transverse vertical section as seen on the line 14—14 of Figure 4; as seen in the direction indicated by the arrows.

More specifically, A and B indicate a pair of spaced parallel horizontal extending winding mandrels; C indicates a carriage arranged between the mandrels A and B and adapted to be moved back and forth longitudinally of said mandrels and on which is carried a pair of cord feeding devices D and E for feeding a length of rubberized cord to either mandrel A or B; F denotes generally a tuber for rubber coating a cord previous to its delivery to the cord feeding devices on the carriage; G indicates generally a structure fitted with mechanism for mechanically operating the mandrels and carriage; and H and I designate a pair of strippers for removing finished strips of cord fabric from the mandrels A and B, respectively.

One end of the mandrel A is revolubly supported on a bearing 15 and the other end thereof is fitted with a mounting 16 whereby it is supported on and adapted to be engaged with and disengaged from a head 17 on the end of a rotary driving spindle 18, and one end of the mandrel B is supported on a bearing 19 and the other end thereof is fitted with a mounting 20 whereby it is supported on and adapted to be engaged with and disengaged from a head 21 on a rotary driving spindle 22. The mountings 16 and 20 of the mandrels A and B are complementary and include manually controlled clutch members J and K, as particularly shown in Figures 9, 10 and 11 and will be hereinafter more fully described.

The spindles 18 and 22 extend parallel to each other and arranged therebetween, on a plane therewith, is a pair of shafts 23 and 24, and extending beneath the shaft 23 is a main drive shaft 25; there being change-speed transmission mechanism operable to place the shafts 18, 22, 23, 24 and 25 in and out of operative connection as will be presently described, whereby the spindles 18 and 22 may be driven at various speeds from the shaft 25. The shaft 25 is adapted to be driven continuously at a uniform speed, being here shown as fitted with a pulley 26 engaged by a belt 27 passing around a driving pulley 28 on the impelling shaft of a motor 29. The transmission mechanism between the main driving shaft 25 and the mandrel-driving spindles 18 and 22 will now be described, it being here shown (see Figures 6 and 13) as embodying a clutch sleeve $a$ loose on the shaft 25 having toothed end faces adapted to be engaged by toothed collars $b$ and $c$ fixed on the shaft 25; the collars $b$ and $c$ being spaced apart on opposite sides of the sleeve $a$, and the sleeve $a$ being adapted to be positioned with its toothed ends out of engagement with the teeth of the collars so that rotation of the shaft 25 will not be transmitted to the sleeve $a$; it being understood that when the sleeve $a$ is engaged with either the collar $b$ or $c$ rotation of the sleeve will be effected. The sleeve $a$ is formed with peripheral spur teeth which constantly mesh with spur gear $d$ fixed on the shaft 23; the teeth on the sleeve $a$ and gear $d$ intermeshing at all times irrespective of the position of the sleeve $a$ whereby on positioning the sleeve $a$ in engagement with either the collar $a$ or $c$ to effect rotation of the sleeve $a$, the shaft 23 will be driven from the shaft 25. Fixed on the shaft 23 are spaced spur gears $e$ and $f$ of different diameters, and splined on the shaft 24 is a sleeve $g$ (see Fig. 4) carrying spur gears $h$ and $i$ adapted to be engaged with the spur gears $e$ and $f$, respectively, on shifting the sleeve $g$ longitudinally of the shaft 24. The gears $h$ and $i$ are also adapted to be positioned out of mesh with the gears $e$ and $f$, as shown in Figure 4, whereby when the sleeve $g$ is disposed in intermediate position no motion will be transmitted from the shaft 23 to the shaft 24, but when the sleeve $g$ is disposed with the gear $h$ intermeshing with the gear $e$, the shaft 24 will be rotated at a relatively slow speed; and when the gear $i$ is intermeshed with the gear $f$ it will be rotated at relatively high speed. Shifting of the sleeve $g$ may be effected in any desired manner, being here shown as controlled by a manually operated slide bar 30.

Fixed on the shaft 24 are spur gears $j$ and $k$ of different diameters which mesh with loose gears $l$ and $m$ carried on the spindle 22. Splined on the spindle 22 (see Figs. 4 and 5) is a clutch sleeve $n$ having toothed ends adapted to be positioned in and out of engagement with toothed hubs formed on the gears $l$ and $m$ whereby rotation of the spindle 22 may be effected either through gear $l$ or the gear $m$ according to which of said gears is engaged with the clutch $n$. The clutch sleeve $n$ is also adapted to be disposed in a neutral position so that rotation of the shaft 24 will not effect rotation of the spindle 22. The clutch sleeve $n$ is adapted to be operated by a manually controlled lever 31.

Figure 17:
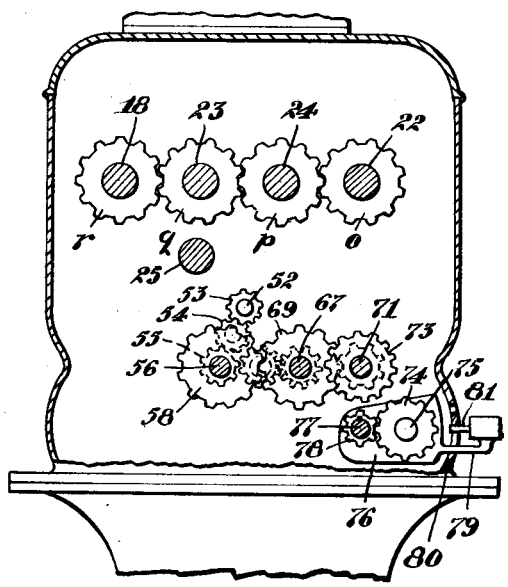
Figure 17 is a view in transverse vertical section with parts shown in elevation as seen on the line 17—17 of Figure 1.

Fixed on the spindle 22 is a spur gear $o$ which meshes with a spur gear $p$ loose on the shaft 24 that in turn meshes with a spur gear $q$ loose on the shaft 23 and which gear $q$ meshes with a spur gear $r$ loose on the spindle 18, as shown in Figs. 4 and 17. A clutch sleeve $s$ splined on the shaft 18 is adapted to be moved in and out of positive engagement with the gear $r$ by means of a manually operated lever 32. The clutch sleeve $s$ serves as a means whereby the mandrel driving spindle 18 may be thrown in and out of operative connection with the mandrel driving spindle 22.

It will now be seen that when the drive shaft 25 is in motion and the clutch members $a$, $g$, $n$ and $s$ are in their engaged positions, rotation of the mandrel driving spindles 18 and 22 will be effected with the spindles 18 and 22 rotating in opposite directions at corresponding speeds and that the speed of rotation of the spindles 18 and 22 may be varied;

the spindles 18 and 22 being rotated at slow speed when the gears *e* and *h* are intermeshed and the clutch *n* is engaged with the gear *m* and the spindles 18 and 22 being rotated at high speed when the gears *f* and *i* are intermeshed and the clutch *n* is engaged with the gear *l*. The spindles 18 and 22 may be rotated at intermediate speeds by engaging the clutch *n* with the gear *l* when the gears *e* and *h* are intermeshed, or by engaging clutch *n* with the gear *m* when the gears *f* and *i* are meshed. The spindles 18 and 22 may be collectively thrown out of operation by disposing either the sleeve *g* or the clutch *n* into a neutral position.

As before stated, driving of the mandrels A and B from the spindles 18 and 22 is manually controlled by manipulation of the clutches J and K; the clutches being adapted to be operated in such manner that while spindles 18 and 22 are rotating continuously in unison the mandrels A and B will be driven alternately; the mandrel B being operatively disconnected from the spindle 22 when the mandrel A is operatively connected to the spindle 18 and vice versa. It will now be seen that when one mandrel is being positively driven the other mandrel is free to be rotated independent of the other mandrel and of its driving shaft. The clutches J and K are also adapted to be disposed in a neutral position so that rotation of the spindles 18 and 22 will not effect rotation of either of the mandrels A and B. The clutches J and K are of complementary construction and are here shown (see Figs. 9, 10 and 11) as embodying toothed clutch members *t* slidable longitudinally in and turnable with the shaft heads 17 and 21 and adapted to be moved in and out of engagement with companion toothed clutch members *u* carried by the mandrels A and B; the clutch members *t* being held against rotation relatively to the shaft heads and being fixedly mounted on slide rods *v* extending into longitudinal bores *w* formed axially of the spindles 18 and 22. The rods *v* are connected to sleeves *x* slidable longitudinally of the spindles 18 and 22 and engaged by yokes *y* carried on a rocker arm *z*, as shown in Figure 12.

The rocker arm *z* comprises a bar which extends transversely across the structure G above the spindles 18 and 22 and has downturned ends which connect with cranks 33 and 34 fixed on rock-shafts 35 and 36 arranged at opposite sides of the machine, and which rockshafts are fitted with operating levers 37 and 38, fitted with spring pressed detents 39 and 40 adapted to engage sockets 41 and 42, formed on opposite side faces of a housing 43 embodied in the structure G. By manipulating the lever 37 or 38 the rocker arm *z* may be manually actuated from either of the opposite sides of the machine to throw the mandrels A and B in and out of operative connection with their driving mechanism through the clutches J and K; the detents 39 and 40 being adapted to ride out of engagement with the sockets 41 and 42 on application of sufficient pressure on either of the operating levers 37 or 38.

The carriage C is slidably supported on a pair of parallel guide bars 50 and 51 extending beneath the mandrels A and B, and has screw engagement with a threaded shaft 52 extending parallel to the guide rods 50 and 51 in such manner that on rotation of the shaft 52 the carriage will be caused to move longitudinally of the guide rods and of the mandrels A and B in either direction according to the direction of rotation of the shaft (see Figs. 7 and 8). The shaft 52 is fitted with a toothed pinion 53, connecting with an idler gear 54 which in turn meshes with a spur gear 55 fixed on a shaft 56.

Loosely carried on the shaft 56 is a pair of spaced spur gears 57 and 58 of different diameters and splined on the shaft 56 between the gears 57 and 58 is a clutch member 59 having toothed end faces adapted to be engaged with toothed faces 60 and 61 on the gears 57 and 58, respectively, to effect engagement between either the gear 57 or 58 and the shaft 56 according to the direction in which the latter is to be rotated. The clutch member 59 is connected to a slide bar 63 one end portion of which extends longitudinally into the shaft 56 axially thereof, which shaft is formed with a tubular end portion to receive the slide bar 63. The other end portion of the slide bar 63 (see Fig. 6) extends in longitudinal parallel relation to the threaded shaft 52, and fixed on the slide bar is a pair of spaced adjustably mounted collars 64 and 65 arranged to extend into the path of travel of a projection 66 formed on the underside of the carriage C; the carriage in its travel operating through the projection 66 and the collars 64 and 65, to shift the bar longitudinally in a direction corresponding to the direction of the movement of the carriage and thereby shift clutch member 59 out of engagement with one of the gears 57 or 58 (see Fig. 8) and into engagement with the other gear so as to effect change of direction of rotation of the screw shaft 52; it being understood that the gears 57 and 58 are rotated in opposite directions. The means for effecting rotation of the gears 57 and 58 embodies a countershaft 67 extending parallel to the shaft 56 on which is fixedly mounted spur gears 68 and 69 of different diameters. The spur gear 68 meshes with an idler gear 70 which in turn meshes with the gear 57, and the gear 69 meshes directly with the gear 58.

Figure 16:
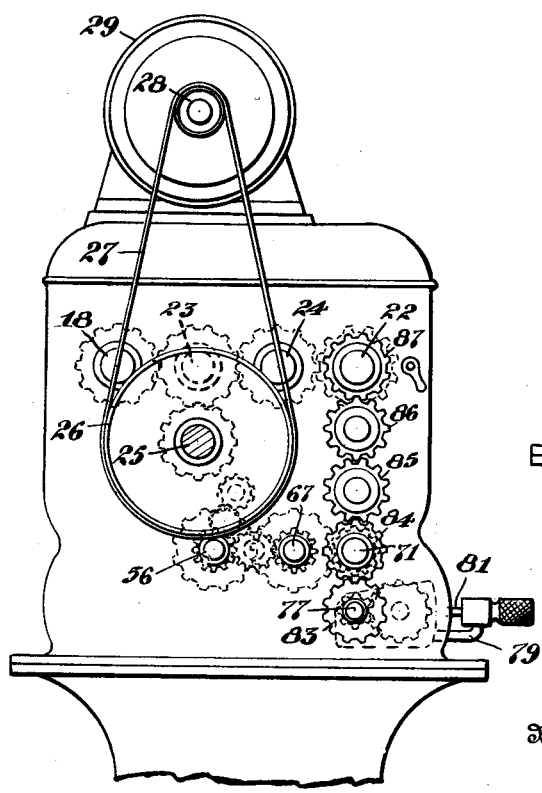
Figure 16 is a view in end elevation as seen on the line 16—16 of Figure 6.

Means are provided for varying the speed of the screw shaft 52 at the will of the operator which embodies a shaft 71 extending parallel to the shaft 67 on which is fixed a gear 72 meshing with the gear 69 on the countershaft 67, and fixed on the shaft 71 is a stepped gear 73 with either of the stepped elements of which is adapted to be engaged by an idler gear 74 (see Fig. 17) mounted on a stud shaft 75 on a carriage 76 rockably supported on and longitudinally slidable of a shaft 77 extending parallel with the shaft 71 on a plane therebeneath. A pinion 78 splined on the shaft 77 is in constant mesh with the gear 74. By shifting the carriage 76 longitudinally on the shaft 77 and rocking it vertically the gear 74 may be positioned in and out of mesh with either of the stepped elements of the gear 73. As a means of determining the position of the gear 74 relative to the gear 73 and also to hold the gear 74 in mesh with said gear 73 the carriage 76 is formed with a handle extension 79 which projects through an inclined slot 80 (see Figs. 1 and 17) formed in the side wall of the housing 43, and carried by the handle 79 is a spring pressed bolt 81 adapted to be engaged with any one of a number of holes 82 formed in the wall of the housing 43 along the upper margin of the slot 80. On disengaging the bolt 81 from a hole 82, the carriage 76 may be shifted manually by the handle 79 and the gear 74 may be thrown into mesh with the gear 73 by rocking the carriage 76 upwardly to bring the gears 74 and 73 into interengagement where they are retained by engaging the bolt 81 with a hole 82. The shaft 77 is designed to be rotated continuously on rotation of the mandrel driving spindle 22 by means of a train of gears indicated at 83, 84, 85, 86 and 87, particularly shown in Figures 1 and 16. The gear 83 is fixed on the shaft 77, the gear 84 is loose on the shaft 71, gears 85 and 86 are loose on stud shafts 88 and 89, and gear 87 is fixed on the spindle 22.

Means are provided whereby movement of the carriage in either direction will be automatically terminated and at the same time cessation of movement of the mandrels effected, which means is here shown as embodying a slide rod 90 (see Fig. 6) one end portion of which extends longitudinally into the drive shaft 25 and connects with the clutch member $a$, as particularly shown in Figure 13, and the other end portion of which extends parallel with the screw shaft 52; the slide rod 90 extending through an opening 91 formed in the carriage C. Adjustably mounted on the rod 90 is a pair of collars 92 and 93 which are adapted on movement of the carriage C, to be engaged by the latter to effect longitudinal movement of the bar 90 in a direction corresponding to the direction of movement of the carriage and to effect movement of the bar 90 such distance as to dispose the clutch member $a$ in its neutral position intermediate the clutch members $b$ and $c$, thereby throwing the drive shaft 25 out of operative connection with the various mechanisms driven therefrom and thus bringing the mandrels and the carriage to rest at the termination of the path of travel of the carriage in either direction.

Figure 15:
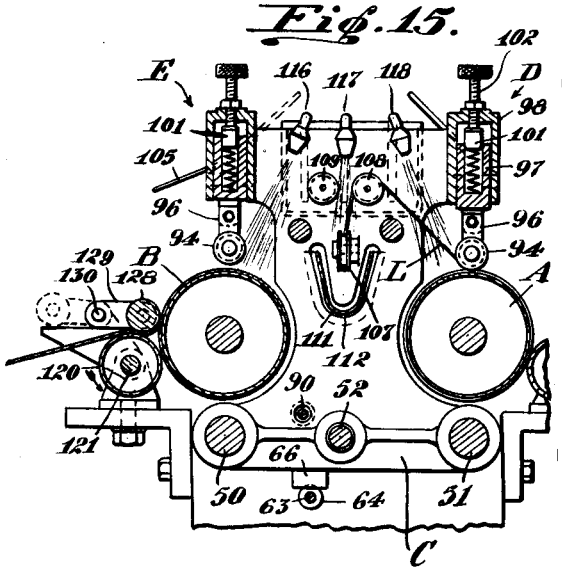
Figure 15 is a view in transverse vertical section as seen on the line 15—15 of Figure 4 with parts in the rear shown in elevation and partly in section as seen in the direction indicated by the arrows.

The cord feeding devices D and E are arranged on the carriage C directly above the mandrels A and B, respectively, as particularly shown in Figure 15. The cord feeding devices are complementary and each includes a feeding and presser roller 94 arranged in close proximity to the upper portion of the perimeter of the mandrel therebeneath (see Figs. 2 and 3). The roller 94 is revolubly mounted on a spindle 95 the axis of which extends parallel to the axis of the winding mandrel and which spindle is carried on a vertically adjustable slide plate 96 carried by a vertically movable slide block 97 supported in a guide way 98 on the carriage C; the slide block 97 being normally maintained in a lowermost position under spring pressure by means of a spring 99 bearing between the bottom of a recess 100 in the slide block and a plunger 101 guided in the recess 100 and which plunger in turn bears against the lower end of a threaded stem 102 adapted to be manually operated to vary the tension of the spring 99 and accordingly, vary the pressure of the roller 94 when the latter is disposed in its operative position to bear on a cord fed between the roller and the periphery of the winding mandrel. The slide block 100 is adapted to be disposed in an elevated position to place the roller 94 out of operative relation with the mandrel which is here shown as effected by means of a cam 103 turnable on a stem 104 carried by the slide block 97 and projecting through an opening in the guide-way 98; the cam being fitted with a handle 105 by means of which it may be manually rocked on the stem 104 so as to cause it to bear on a shoulder 106 on the guide-way 98 to effect elevation of the slide block 97 and to retain the latter in its uppermost position. The cam-disk is adapted to be rocked to free it from the shoulder 106 so as to permit the slide block 97 to be disposed in its lowermost position under action of the spring 99.

Mounted on the carriage C is a direction roller 107 the axis of which extends at right angles to the axis of the rollers 94 on a plane therewith; the roller 107 being positioned on the carriage at a point intermediate the rollers 94. Arranged on a plane above the roller 107 is a pair of direction rollers 108 and 109 having their axis extending in the direction of the axis of the rollers 94; the rollers 108 and 109 being positioned on opposite sides of a plane extending mid-way of the width of the roller 107. The rollers 107, 108 and 109 serve as direction rollers to direct a rubber coated cord L from the tuber F to the presser rollers 94; the cord L being passed under and around the roller 107 up and over the roller 108 and thence under the pressure roller 94 on the cord feeding device D when feeding the cord to the mandrel A, and the cord passing from the roller 107 up and over the roller 109 and under the roller 94 on the cord feeding device E when feeding the cord to the mandrel B. The direction roller 107 is mounted on the carriage C in such relation to the feed orifice 110 of the tuber F that the length of the cord extending between the tuber and the carriage will lie on a substantially horizontal plane. As a means for obviating any possibility of the cord L accidentally being brought into contact with the winding mandrels in event the length of cord between the tuber and the carriage breaks, a guard trough 111 of substantially U-shaped cross section is supported at its ends on the frame of the machine to extend longitudinally between the winding mandrels A and B with the side portions of the trough extending upwardly beyond the opposite sides of the horizontal length of the cord L; the carriage C being formed with an opening 112 through which the trough 111 extends.

Means are provided for spraying the cord L as it approaches the roller 107 and also for spraying the mandrels A and B which is here shown as embodying a liquid containing tank 113 carried by the carriage C to which air is delivered under pressure through a pipe 114 connecting with any suitable source of compressed air supply through a flexible hose 115 and leading from the tank 113 is a series of spray nozzles 116, 117 and 118. The nozzle 117 is arranged to direct a moist spray onto the cord L as the latter approaches the roller 107, while the nozzles 116, 117 and 118 are arranged to direct a moist spray to the mandrels A and B at or in advance of the point where the cord L is being wound on the mandrel.

Means are provided for stripping the wound fabric from the mandrels operable to remove the completed fabric from one mandrel during the operation of winding the fabric on the other mandrel, which means is indicated generally at H and I and each of which embodies a roller 120 extending parallel with the adjacent mandrel and spaced a short distance therefrom; the roller 120 being fixed on a shaft 121 fitted with a pulley 122 around which passes a belt 123 leading to a double idler pulley 124 on a stud shaft 125 and from which idler pulley also passes a belt 126 rove around a pulley 127 on the screw shaft 52 whereby on rotation of the screw shaft the rollers 122 will be driven. The rollers 120 are designed to rotate when performing the stripping action, in the direction indicated by the arrow in Figure 15. Associated with the roller 120 is an idler roller 128 supported on rockers 129 pivoted at 130 as particularly shown in Figures 14 and 15; the roller 128 being adapted to be positioned to operate as an idler between the mandrel and the roller 122 when effecting the stripping action, as shown in full lines in Figure 15, and is adapted to be positioned out of operative relation to the mandrel and roller 120 as indicated in dotted lines in Figure 15.

The mandrels A and B are formed with spirally arranged grooves 131 which serve as guides for a cutter that may be manually held therein during rotation of a mandrel to effect severance of the completed fabric sheet on the roller and to cut the fabric sheet on the bias into strips of finished width.

The tuber F may be of any suitable construction whereby the cord L on being drawn therethrough will be impregnated and coated with a rubber compound, the cord L on emerging from the opening 110 in the tuber being uniformly coated with the rubber composition fed thereto by a screw 132, as fully set forth in Letters Patent of the United States, No. 1,464,632, issued to me August 14, 1923.

In the operation of the invention the carriage C is initially positioned adjacent either end of the mandrels and when so positioned will operate through the slide rod 90 to dispose the clutch member a in its intermediate or neutral position, whereby the spindles 18 and 22 and the mandrels will be thrown out of operation, and will also operate through the slide rod 63 to dispose the clutch member 59 in a neutral position whereby the carriage C will be stationary.

The operator then roves the end portion of the coated cord L around the rollers on the carriage C, as shown in Figure 15 and affixes the end of the cord to the mandrel on which it is to be wound, whereupon the operator shifts the slide rod 90 to throw the clutch member a into engagement with either the clutch member b or c to effect driving of the spindle 18 or 22 according to which mandrel is to be driven, whereupon the selected spindle will be set in operation. In the meantime both mandrels may be disposed out of operative connection to the driving spindles by the operator placing the clutches J and K in neutral. The mandrel on which the cord is to be wound is then set in operation by operating the hand lever 37 or 38, whereupon the operator manually shifts the rod 63 to set the screw shaft 52 in operation whereby the carriage C is caused to advance so as to feed the cord to the mandrel in such manner that as the latter rotates the cord will be wound spirally thereon with adjacent spirals closely abutting against each other. The speed of travel of the carriage relative to the peripheral speed of the mandrel may be varied as occasion requires to accommodate cords of various sizes, and also mandrels of different diameters by means of the speed gear 73 and its driving gear 74. The peripheral speed of the mandrels may also be varied relative to the movement of the carriage C by means of the variable speed transmission interposed between the driving shaft 25 and the spindles 18 and 22, as before described. By the provision of the variable speed mechanism controlling the mandrels and the carriage various sizes of mandrels may be set in the machine according to the size of the fabric sheet to be formed.

The cord is thus wound automatically on a mandrel and when the carriage is advanced to a position adjacent the end of the mandrel opposite that from which it started the carriage will actuate the slide rods 63 and 90 to automatically effect cessation of movement of the carriage and of the driven mandrel, whereupon the operator severs the cord from the finished fabric sheet and connects it with the other mandrel and again sets the machine in operation, as before described. The operator then severs a portion of the wound fabric sheet adjacent one end of the mandrel on which it is wound by cutting the fabric along the end portion of the spiral channel 131, and then feeds the severed end portion of the fabric over the roller 120, as shown in Figure 1. The roller 128 is then positioned above the fabric sheet by swinging the latter from its inoperative position. The severed end portion of the fabric strip will then be engaged between the rollers 120 and 128 whereupon rotation of the roller 120 will act to strip the fabric from the mandrel; the operator effecting severence of the sheet by causing a cutter to advance along the spiral groove 131 as the mandrel rotates. It will be understood that during this operation the cord carrying mandrel will be free and will revolve independent of its driving mechanism, and that this stripping action may be accomplished during the time that the cord is being wound on the other mandrel. In this manner rapidity of output is insured. On completion of the stripping action the operator restores the roller 128 to its inoperative position.

In removing the sheet from the mandrels the operator may sever the sheet throughout the length of the spiral groove by manually rotating the mandrel while effecting the cutting operation, and thereafter feed the end portion of the severed strip to the stripping rollers.

The machine is adapted to operate with mandrels of various diameters; the adjustable presser roller carrying plate 96 permitting the presser rollers being positioned so as to accommodate the presser rollers to mandrels of various sizes.

I claim:—

1. In a cord fabric winding machine, a winding mandrel, a carriage operable to move back and forth longitudinally of said mandrel, means carried by said carriage for feeding a coated cord to said mandrel, and means on said carriage for delivering a moist spray to the cord and mandrel as the carriage advances.

2. In a cord fabric winding machine, a pair of winding mandrels, means for selectively driving the mandrels at variable speeds, a carriage for movements longitudinally of the mandrels, means for varying the speed of carriage movement, means carried by the carriage for feeding a cord to either of said winding mandrels, and means carried by the carriage for spraying the cord and spraying the mandrel on which it is wound in advance of the point of winding.

3. In a cord fabric winding machine, a pair of winding mandrels, means for selectively driving the mandrels at variable speeds, a carriage for movements longitudinally of the mandrels, means for varying the speed of carriage movement, means carried by the carriage for feeding a cord to either of said winding mandrels, means carried by the carriage for spraying the cord and spraying the mandrel on which it is wound in advance of the point of winding, and means for stripping the wound cord from one mandrel during the time of winding on the other mandrel.

4. In a cord fabric winding machine, a pair of winding mandrels, fixed bearings for said mandrels, means for rotating the mandrels, a guide, a carriage mounted for longitudinal movements on said guide between said mandrels, means for advancing said carriage, and means on said carriage whereby a cord directed from a single source apart from the carriage may be fed to either of said mandrels without change in their positions and operable to wind a cord fabric on one mandrel, while the carriage is moving in one direction, and to wind the cord fabric on the other mandrel when the carriage is moving in the other direction.

HERBERT N. WAYNE.